(12) United States Patent
Watanabe et al.

(10) Patent No.: US 7,508,442 B2
(45) Date of Patent: Mar. 24, 2009

(54) CAMERA SYSTEM AND CAMERA BODY

(75) Inventors: Mikio Watanabe, Asaka (JP); Satoshi Nakamura, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 711 days.

(21) Appl. No.: 11/090,152

(22) Filed: Mar. 28, 2005

(65) Prior Publication Data

US 2005/0212948 A1 Sep. 29, 2005

(30) Foreign Application Priority Data

Mar. 29, 2004 (JP) ............................. 2004-094868

(51) Int. Cl.
*H04N 5/225* (2006.01)
*G03B 17/00* (2006.01)

(52) U.S. Cl. ...................................... 348/360; 396/529
(58) Field of Classification Search ......... 348/335–361; 396/529–532
See application file for complete search history.

(56) References Cited

U.S. PATENT DOCUMENTS

| | | | | |
|---|---|---|---|---|
| 4,448,509 A | * | 5/1984 | Katsuma et al. | 396/532 |
| 4,739,356 A | * | 4/1988 | Ogura et al. | 396/532 |
| 4,766,453 A | * | 8/1988 | Shiokama et al. | 396/532 |
| 4,945,376 A | * | 7/1990 | Kawasaki et al. | 396/93 |
| 4,974,011 A | * | 11/1990 | Azuma et al. | 396/11 |
| 5,572,278 A | * | 11/1996 | Hamada et al. | 396/49 |
| 5,594,517 A | * | 1/1997 | Tsunefuji | 396/87 |
| 5,999,753 A | * | 12/1999 | Hirai et al. | 396/227 |
| 7,042,499 B1 | * | 5/2006 | Kido et al. | 348/211.14 |
| 2002/0025147 A1 | * | 2/2002 | Konishi et al. | 396/72 |
| 2004/0062545 A1 | * | 4/2004 | Ushiro | 396/529 |
| 2004/0202464 A1 | * | 10/2004 | Miyasaka et al. | 396/529 |
| 2004/0263428 A1 | * | 12/2004 | Sudo | 345/7 |
| 2005/0212921 A1 | * | 9/2005 | Horii | 348/211.14 |
| 2005/0212954 A1 | * | 9/2005 | Senba et al. | 348/360 |

FOREIGN PATENT DOCUMENTS

| | | |
|---|---|---|
| JP | 8-172561 A | 7/1996 |
| JP | 2000-152070 A | 5/2000 |
| JP | 2000-175089 A | 6/2000 |
| JP | 2000-184254 A | 6/2000 |
| JP | 2001-257917 A | 9/2001 |

* cited by examiner

*Primary Examiner*—Sinh N Tran
*Assistant Examiner*—Daniel M Pasiewicz
(74) *Attorney, Agent, or Firm*—Sughrue Mion, PLLC (57) ABSTRACT

The present invention provides a camera body with high operability and a camera system with high operability including the camera body and an image pickup lens unit that is detachably mounted on the camera body. The camera body has two modes, namely, a photographing mode for receiving an image signal from the image pickup lens unit, applying signal processing to the image signal, and recording the image signal and a reproduction mode for reading out a recorded image signal and displaying an image based on the image signal on a display screen and includes a mode switching section that switches these two modes freely according to operation.

16 Claims, 9 Drawing Sheets

CAMERA SYSTEM AND CAMERA BODY

BACKGROUND OF THE INVENTION

1. Field of the Invention

The present invention relates to a camera body on which an image pickup lens unit that includes a photographing optical system and an image pickup element is detachably mounted, and a camera system including the camera body and an image pickup lens unit.

2. Description of the Related Art

Conventionally, in the field of a silver salt camera, there is known a camera system of a lens detachable type with a photographing lens detachably mounted on a camera body.

In recent years, in the field of a digital camera, a digital camera of a lens unit detachable type has been proposed as in the field of a silver salt camera. For example, Japanese Patent Application Laid-Open No. 8-172561 (pages 2 to 4, FIG. 1) discloses a camera system that includes a lens unit, in which an image pickup element and an optical system are maintained in a predetermined positional relation, and a camera body, to which the lens unit is connected, and facilitates replacement of the lens unit.

In addition, for example, Japanese Patent Application Laid-Open No. 2000-175089 (pages 2 to 4, FIG. 1) discloses a camera system that includes: an interchangeable lens unit having a photographing lens, an image pickup element, and storing means, which receives a control program from a camera body and stores the control program; and a camera body having processing means, which subjects an image signal from the image pickup element to signal processing and then records the image signal in a recording medium, and a central processing unit, which controls the processing means on the basis of the control program received from the storing means. The interchangeable lens unit is detachably mounted on the camera body.

In recent years, in accordance with advances in a liquid crystal display apparatus and various communication device techniques, it has become possible to give a camera not only the photographing function and the recording function described above but also a reproducing function for reproducing image information obtained by photographing, a communication function for transmitting and receiving image information to and from other apparatuses, or the like. A digital camera having such plural functions is widely spread.

However, when the plural functions are given to the camera as described above, various problems occur from the viewpoint of operability of the camera. For example, in the conventional digital camera, since precision elements such as the photographing optical system and the image pickup element are always incorporated in the camera main body, a user has to operate the digital camera carefully such that a shock is not applied to the digital camera.

In addition, since photographing operation of a camera is usually performed in a state in which the camera is retained in a horizontal position, as a premise, the user also operates the camera with both hands at the time of reproduction of image information. This is often inconvenient because the user uses both hands while moving and the like, and thus operability of the camera falls.

Further, it is possible to improve the photographing function by adopting a camera system including an image pickup lens unit, in which a photographing optical system and an image pickup element are integrated, and making the image pickup lens unit replaceable. However, there is a problem in that it is hard to use the camera system when operability for the reproduction function, the communication function, and the like is still low.

Japanese Patent Application Laid-Open No. 8-172561 and Japanese Patent Application Laid-Open No. 2000-175089 disclose the invention concerning the photographing function and the recording function but do not refer to operability of the entire camera system including the reproduction function, the communication function and the like.

SUMMARY OF THE INVENTION

The invention has been made in view of the circumstances described above and provides a camera body with high operability and a camera system with high operability including the camera body and an image pickup lens unit detachably mounted on the camera body.

A camera system of the invention is a camera system of an image pickup lens unit detachable type, including: an image pickup lens unit that includes a photographing optical system and an image pickup element; and a camera body that includes a recessed mount section on which the image pickup lens unit is detachably mounted, communicates with the image pickup lens unit mounted on the mount section, and receives an image signal from the image pickup lens unit to apply signal processing to the image signal, in which the camera body includes: a mount barrier that blocks an opening of the mount section and is pushed by the image pickup lens unit to retract to the inner part of the recess of the mount section when the image pickup lens unit is mounted; a sensor that detects attachment and detachment of the image pickup lens unit to and from the mount section; a display screen that displays an image based on an image signal; and amode switching section that, according to an operation, freely switches a photographing mode for receiving an image signal from the image pickup lens unit, subjecting the image signal to signal processing, and recording the image signal and a reproduction mode for reading out the recorded image signal and displaying an image based on the image signal on the display screen, and the mode switching section forcibly switches the photographing mode to the reproduction mode in response to detection of removal of the image pickup lens unit by the sensor.

According to the camera system of the invention, since the mode switching section forcibly switches the photographing mode to the reproduction mode in response to detection of removal of the image pickup lens unit by the sensor, operation by a user is simplified, and high operability is obtained.

Here, the camera body in the camera system of the invention may include plural operators and a function switching section that switches a function of at least one of the plural operators according to attachment and detachment of the image pickup lens to and from the camera body.

In the case in which the camera system of the invention is constituted as described above, since it is possible to switch a function of the plural operators to a function suitable for a situation of use, operation by a user is further simplified, and higher operability is obtained.

The camera body of the camera system of the invention may display an image on the display screen in the reproduction mode and also display an image based on an image signal received from the image pickup lens unit on the display screen in the photographing mode, and include a function switching section that switches an orientation of an image displayed on the display screen according to attachment and detachment of the image pickup lens unit to and from the camera body.

In the case in which the camera system of the invention is constituted as described above, since an orientation of an image displayed on the display screen is switched according to attachment and detachment of the image pickup lens unit, operation by a user is further simplified, and higher operability is obtained.

The camera body in the camera system of the invention may include a communication section that carries out communication with the outside and a function switching section that turns OFF a function of the communication section in response to mounting of the image pickup lens unit and turns ON the function of the communication section in response to removal of the image pickup lens unit according to attachment and detachment of the image pickup lens unit to and from the camera body.

In the case in which the camera system of the invention is constituted as described above, since it is possible to turn ON and OFF the function of the communication section according to attachment and detachment of the image pickup lens unit, operation by a user is further simplified, and higher operability is obtained.

The camera body in the camera system of the invention may have an automatic switching mode for automatically switching a function and a manual switching mode in which automatic switching of a function is prohibited and include a switching mode switching section that switches the automatic switching mode and the manual switching mode, and the function switching section may act when the automatic switching mode is set.

In the case in which the camera system of the invention is constituted as described above, since it is possible to switch the automatic switching mode and the manual switching mode with the switching mode switching section, operation by a user is further simplified and higher operability is obtained.

The communication section in the camera system of the invention may be a communication section that performs radio transmission or a communication section that performs wired transmission.

In the case in which the camera system of the invention is constituted as described above, since it is possible to select radio transmission and wired transmission freely, operation by a user is further simplified, and higher operability is obtained.

In addition, a camera body of the invention is a camera body that includes a recessed mount section on which an image pickup lens unit including a photographing optical system and an image pickup element is mounted detachably, communicates with the image pickup lens unit mounted on the mount section, and receives an image signal from the image pickup lens unit to apply signal processing to the image signal, including: a mount barrier that blocks an opening of the mount section and is pushed by the image pickup lens unit to retract to the inner part of the recess of the mount section when the image pickup lens unit is mounted; a sensor that detects attachment and detachment of the image pickup lens unit to and from the mount section; a display screen that displays an image based on an image signal; and a mode switching section that, according to an operation, freely switches a photographing mode for receiving an image signal from the image pickup lens unit, subjecting the image signal to signal processing, and recording the image signal and a reproduction mode for reading out the recorded image signal and displaying an image based on the image signal on the display screen, in which the mode switching section forcibly switches the photographing mode to the reproduction mode in response to detection of removal of the image pickup lens unit by the sensor.

According to the camera body of the invention, since the photographing mode is forcibly switched to the reproduction mode by the mode switching section in response to detection of removal of the image pickup lens unit by the sensor, operation by a user is simplified, and high operability is obtained.

The camera body of the invention may include plural operators and a function switching section that switches a function of at least one of the plural operators according to attachment and detachment of the image pickup lens unit.

In the case in which the camera body of the invention is constituted as described above, since it is possible to switch a function of the plural operators to a function suitable for a situation of use, operation by a user is further simplified, and higher operability is obtained.

The reproduction mode in the camera body of the invention may be a mode for displaying an image on the display screen and the photographing mode may be a mode for displaying an image based on an image signal received from the image pickup lens unit, and the camera body may include a function switching section that switches an orientation of an image displayed on the display screen according to attachment and detachment of the image pickup lens unit to and from the camera body.

In the case in which the camera body of the invention is constituted as described above, since an orientation of an image displayed on the display screen is switched according to attachment and detachment of the image pickup lens unit, operation by a user is further simplified, and higher operability is obtained.

Also, the camera body of the invention may include a communication section that carries out communication with the outside and a function switching section that turns OFF a function of the communication section in response to mounting of the image pickup lens unit and turns ON the function of the communication section in response to removal of the image pickup lens unit according to attachment and detachment of the image pickup lens unit to and from the camera body.

In the case in which the camera body of the invention is constituted as described above, since it is possible to turn ON and OFF the function of the communication section according to attachment and detachment of the image pickup lens unit, operation by a user is further simplified, and higher operability is obtained.

Further, the camera body of the invention may have an automatic switching mode for automatically switching a function and a manual switching mode in which automatic switching of a function is prohibited and includes a switching mode switching section that switches the automatic switching mode and the manual switching mode, and the function switching section may act when the automatic switching mode is set.

In the case in which the camera system of the invention is constituted as described above, since it is possible to switch the automatic switching mode and the manual switching mode with the switching mode switching section, operation by a user is further simplified and higher operability is obtained.

As described above, according to the invention, it is possible to realize a camera system with high operability and a camera body constituting the camera system.

DETAILED DESCRIPTION OF THE INVENTION

An embodiment of the invention will be hereinafter described with reference to the accompanying drawings.

Figure 1:
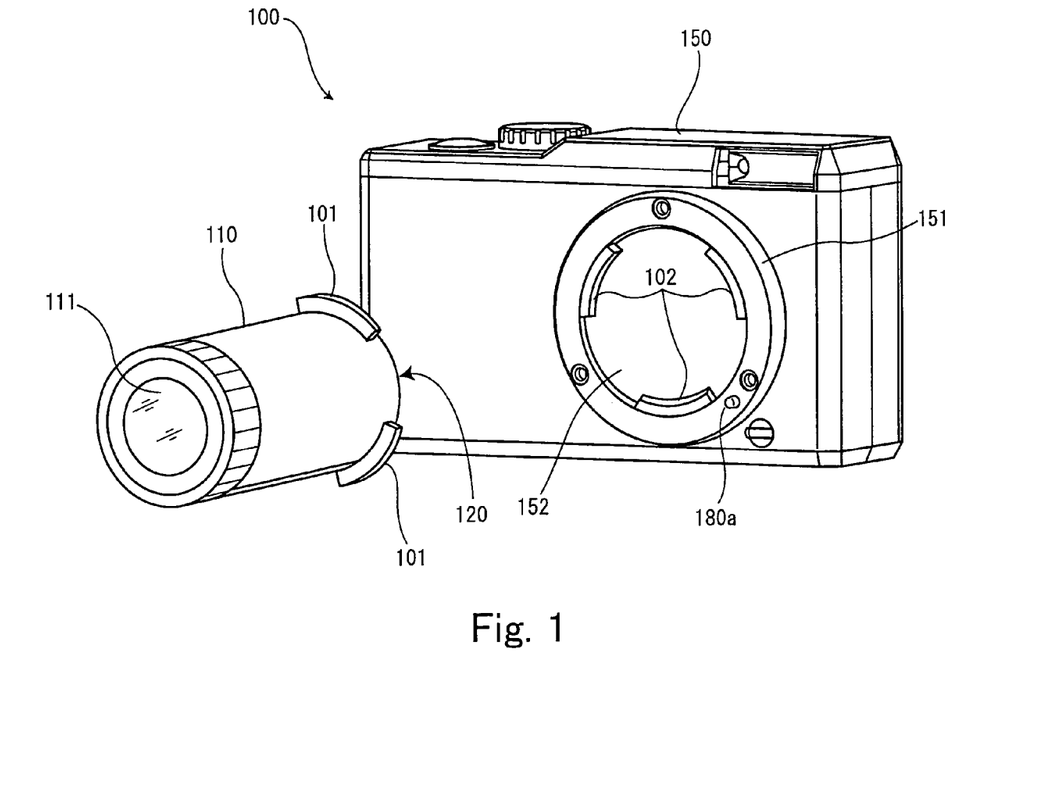
FIG. 1 is an external view of a camera system according to an embodiment of the invention viewed from the front.

FIG. 1 is an external view of a camera system according to an embodiment of the invention viewed from the front.

As shown in FIG. 1, a camera system 100 is a camera system of an image pickup lens unit detachable type that includes an image pickup lens unit 110 and a camera body 150. Plural projections 101 are provided in a base 120 of the image pickup lens unit 110 to be engaged with engaging sections 102 provided in the inside of a recessed mount section 151 of the camera body 150. The image pickup lens unit 110 is detachably mounted on the mount section 151. When the image pickup lens unit 110 is attached to the camera body 150, communication between the camera body 150 and the image pickup lens unit 110 is performed. The camera body 150 receives an image signal from the image pickup lens unit 110 to apply signal processing to the image signal.

The image pickup lens unit 110 includes a photographing optical system 111 and an image pickup element (not shown).

The camera body 150 includes: the mount section 151; a mount barrier 152 that blocks an opening of the mount section 151 and is pushed by the image pickup lens unit 110 at the time of mounting of the image pickup lens unit 110 to retract to the inner side of the recess of the mount section 151; a body side electric contact (not shown) provided in the inside to perform communication with the image pickup lens unit 110, and a sensor (not shown) that detects attachment and detachment of the image pickup lens unit 110 to and from the mount section 151.

This camera body 150 has a photographing function for receiving an image signal from the image pickup lens unit 110 and applying signal processing to the image signal to record the image signal and also has a reproduction function for reading out an image signal stored in the inside of the camera body 150 and displaying an image based on the image signal on a display screen (not shown) provided on the back side of the camera body 150.

Figure 2:
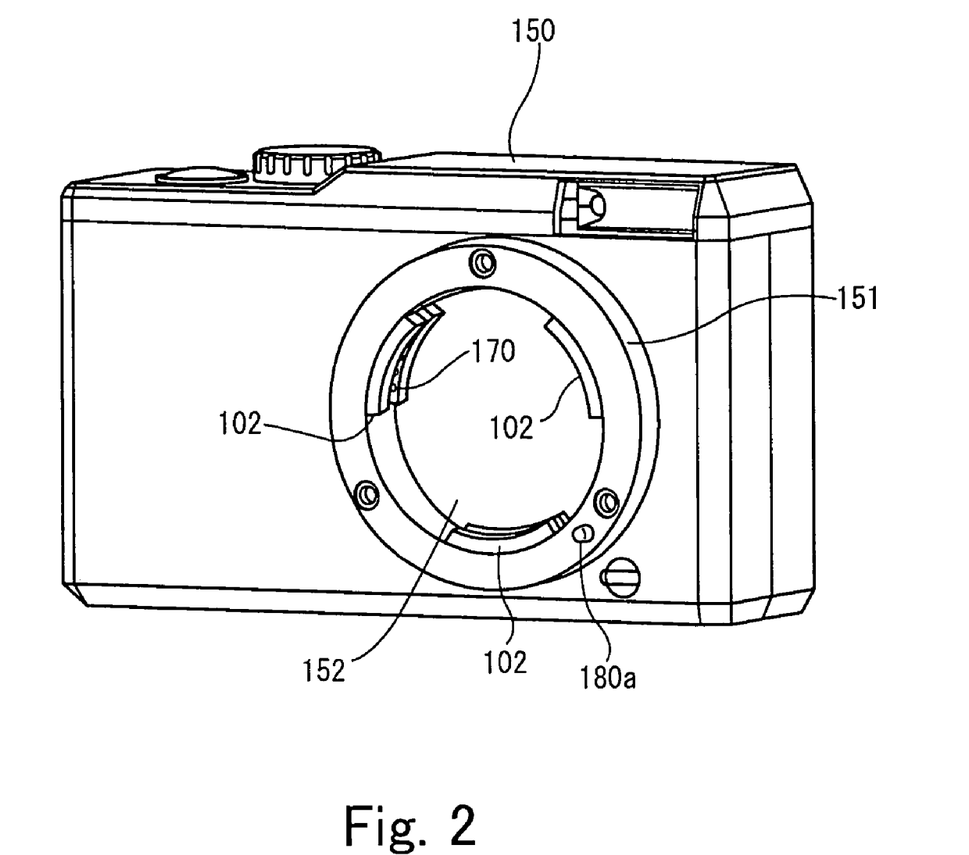
FIG. 2 is an external view showing only a camera body at the time when an image pickup lens unit is mounted in the camera system shown in FIG. 1.

FIG. 2 is an external view showing only a camera body of the camera system shown in FIG. 1 at the time when an image pickup lens unit is mounted thereon.

When the image pickup lens unit 110 (see FIG. 1) is mounted on this camera body 150, a detection pin 180a of the sensor comes into contact with the base 120 (see FIG. 1) of the image pickup lens unit 110, whereby mounting of the image pickup lens unit 110 on the mount section 151 is detected. In addition, at this point, the mount barrier 152 is pushed by the base 120 of the image pickup lens unit 110 to retract to the inner side of the recess of the mount section 151. The image pickup lens unit 110 is rotated in a predetermined direction in this state, whereby the projections 101 (see FIG. 1) of the image pickup lens unit 110 and the engaging sections 102 provided in the inside of the mount section 151 engage with each other and, at the same time, a lens unit side electric contact (not shown) and the body side electric contact (not shown) are electrically connected to bring the image pickup lens unit 110 and the camera body 150 into a state in which the image pickup lens unit 110 and the camera body 150 are capable of communicating with each other.

Note that, in this embodiment, a camera system adopting an engagement system of a rotation type using the projections 101 and the engagement sections 102 as shown in FIGS. 1 and 2 is explained. However, the camera system of the invention is not limited to the engagement system of the rotation type and may adopt an engagement system in which engagement is performed simply by pressing the image pickup lens unit 110 against the mount section of the camera body 150.

Figure 3:
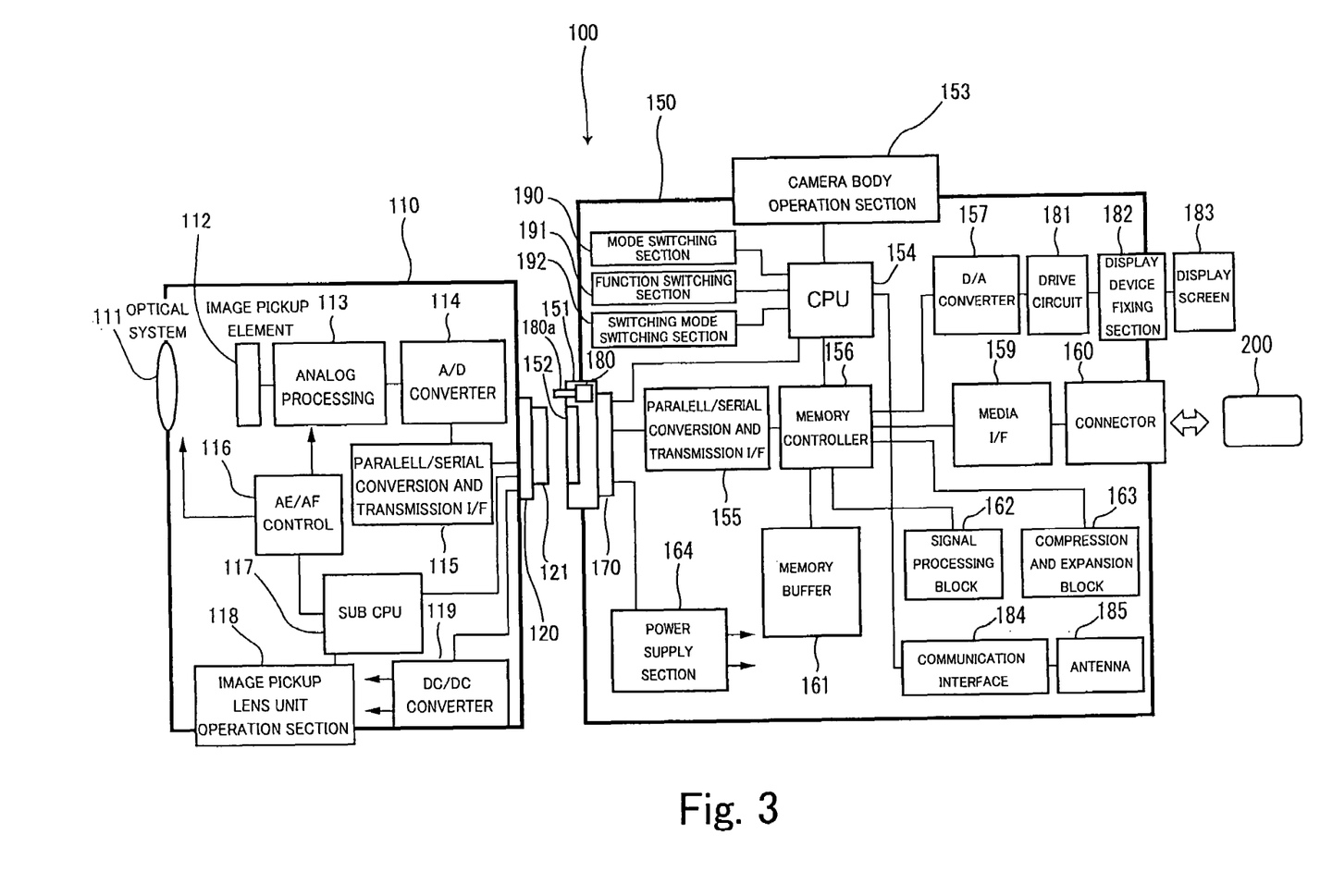
FIG. 3 is a block diagram showing the camera system according to the embodiment.

FIG. 3 is a block diagram showing the camera system according to the embodiment.

As shown in FIG. 3, this camera system 100 is a camera system including: an image pickup lens unit 110 that includes a photographing optical system 111 and an image pickup element 112; and a camera body 150 that includes a mount section 151 to which the image pickup lens unit 110 is detachably mounted, performs communication with the image pickup lens unit 110 mounted on the mount section 151, receives an image signal from the image pickup lens unit 110, and applies signal processing to the image signal.

Other than the photographing optical system 111, an image pickup element 112, and a lens unit side electric contact 121, the image pickup lens unit 110 includes an analog processing circuit 113 that performs processing such as gain control and noise reduction for an image signal (CCD_RAW) outputted from the image pickup element 112, a digital/analog (D/A) converter 114 that converts an analog signal into a digital signal, a parallel/serial conversion and transmission interface 115 that converts a parallel signal into a serial signal, an image pickup lens unit operation section 118 that receives an operation instruction from a user, an AE/AF control circuit 116 that performs automatic exposure control/automatic focus control, a sub-central processing unit (CPU) 117 that controls operations of the respective sections in the image pickup lens unit 110, and a DC/DC converter 119 that converts a DC voltage received from the camera body 150 via the lens unit side electric contact 121 into a DC voltage required by the respective sections in the image pickup lens unit 110 and supplies the DC voltage to the respective sections.

A CCD_RAW signal photographed by the photographing optical system 111 and outputted from the image pickup element 112 is subjected to the processing such as gain control and noise reduction in the analog processing circuit 113, converted into a digital signal by the A/D converter 114, converted into a serial signal by the parallel/serial conversion and transmission interface 115, and then transmitted to the camera body 150 via the lens unit side electric contact 121 and a body side electric contact 170. Note that, as the image pickup element 112, a charge coupled device (CCD), a complementary metal oxide semiconductor (CMOS), and the like can be used.

Note that connection of the lens unit side electric contact 121 and the body side electric contact 170 will be explained in detail with reference to FIG. 5.

Other than the mount section 151, a mount barrier 152, the body side electric contact 170, and a sensor 180, the camera body 150 includes: a camera body operation section 153 that receives an operation instruction from a user; a CPU 154 that supervises control of the entire camera body 150; a signal processing block 162 that performs white balance correction and gamma correction for a CCD_RAW signal received from the image pickup lens unit 110 and converts the CCD_RAW signal into a YCbCr signal (luminance/hue difference); a memory buffer 161 that temporarily stores the CCD_RAW signal, the YCbCr signal, data after compression, and the like; a memory controller 156 that controls the memory buffer 161; a parallel/serial conversion transmission interface 155 that performs parallel/serial conversion processing for transmission and reception signals between the camera body 150 and the image pickup lens unit 110; a compression and expansion block 163 that compresses/expands the YCbCr signal; a D/A converter 157 that converts a digital signal stored in the memory buffer 161 into an analog signal; a display screen 183 that displays an image based on the analog signal outputted from the D/A converter 157, consists of, for example, a liquid crystal display (LCD), and is removable from the camera body 150; a display screen fixing section 182 that fixes the display screen 183 to the camera body 150; a drive circuit 181 that drives the display screen 183 according to the analog signal received from the D/A converter 157; a media interface 159 and a connector 160 for recording compressed image information in an external storage medium 200 such as a memory card; and a power supply section 164 that supplies power to the respective sections of the camera body 150 and supplies necessary power to the image pickup lens unit 110 side via the body side electric contact 170.

Moreover, this camera body 150 includes a communication interface 184 and an antenna 185 for performing communication with the image pickup lens unit 110 on the basis of an instruction from the CPU 154. These communication interfaces 184 and the antenna 185 are equivalent to the communication section of the invention.

Note that, as the communication section, FIG. 3 shows an example of a communication section that includes the communication interface 184 and the antenna 185 and performs radio transmission. The communication section may be constituted as a communication section that performs wired transmission.

This camera body 150 has two modes, namely, a photographing mode for receiving an image signal from the image pickup lens unit 110, applies signal processing to the image signal, and recording the image signal and a reproduction mode for reading out a recorded image signal and displaying an image based on the image signal on the display screen. The camera body 150 includes a mode switching section 190 that switches these two modes freely according to operation.

This mode switching section 190 forcibly switches the photographing mode to the reproduction mode in response to detection of removal of the image pickup lens unit 110 by the sensor 180.

In addition, the camera body 150 according to the embodiment includes a function switching section 191 that performs three actions to be explained below.

A first action of the three actions of the function switching section 191 is an action of switching a function of one of plural operators (described below) included in the camera body 150 according to the embodiment, for example, a cross key 194 (see FIG. 6) according to attachment and detachment of the image pickup lens unit 110 to and from the camera body 150.

The camera body 150 according to the embodiment is constituted to display an image on the display screen 183 in the reproduction mode and also display an image based on an image signal received from the image pickup lens unit 110 on the display screen 183 in the photographing mode. In the camera body 150 thus constituted, an action of switching an orientation of an image displayed on the display screen 183 according to attachment and detachment of the image pickup lens unit 110 to and from the camera body 150 is equivalent to a second action of the three actions of the function switching section 191.

A third action of the three actions of the function switching section 191 is an action of, according to attachment and detachment of the image pickup lens unit 110 to and from the camera body 150, turning OFF the communication function by the communication interface 184 and the antenna 185 in response to mounting of the image pickup lens unit 110 and turning ON the communication function by the communication interface 184 and the antenna 185 in response to removal of the image pickup lens unit 110.

The camera body 150 according to the embodiment has an automatic switching mode for automatically switching a function and a manual switching mode in which automatic switching of a function is prohibited. The camera body 150 includes a switching mode switching section 192 that switches the automatic switching mode and the manual switching mode.

In this embodiment, the function switching section 191 is constituted to act when the automatic switching mode is set by the switching mode switching section 192.

Note that the camera system of the invention is not limited to the embodiment shown in FIG. 3 and can be constituted as camera systems of various forms according to, for example, a type of an image pickup lens, the number of pixels of a CCD, whether the camera system is used for moving image photographing or still image photographing, presence or absence of a photographing support mechanism such as hand shake correction, and an application such as a camera including plural CCDs and lenses for three-dimensional video photographing.

Figure 4:
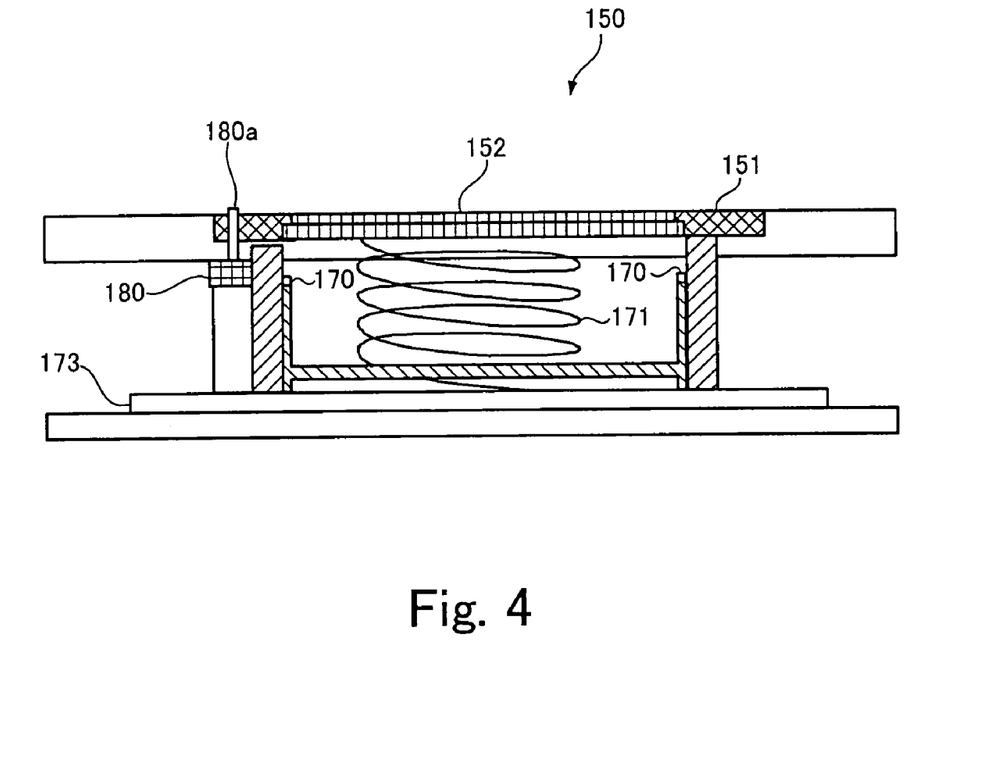
FIG. 4 is a sectional view of the camera system according to the embodiment before the image pickup lens unit is mounted.

FIG. 4 is a sectional view of the camera system according to the embodiment before the image pickup lens unit is mounted.

FIG. 4 shows the camera body 150 before the image pickup lens unit 110 is mounted. The camera body 150 includes the recessed mount section 151 on which the image pickup lens unit 110 is detachably mounted. The mount section 151 includes the body side electric contact 170 and the mount barrier 152. The body side electric contact 170 is connected to a circuit board 173 on which elements such as the CPU 154 (see FIG. 3) provided in the camera body 150 is mounted. When the body side electric contact 170 is connected to the lens unit side electric contact 121, it is possible to transmit and receive a signal between the camera body 150 and the image pickup lens unit 110.

The mount barrier 152 is constituted to block the opening of the mount section 151 and to be pushed by the image pickup lens unit 110 to retract to the inner side of the recess of the mount section 151 when the image pickup lens unit 110 is mounted. This mount barrier 152 protects the body side electric contact 170 in the inside of the mount section 151 and prevents dusts from entering the inside of the camera body 150 and is formed of aluminum or the like.

The sensor 180 is arranged in the inside of the mount section 151. FIG. 4 shows a state in which the detection pin 180a of the sensor 180 projects from the surface of the mount section 151. When this detection pin 180a is retracted into the mount section 151, the sensor 180 detects mounting of the image pickup lens unit 110.

In this embodiment, the mount barrier 152 blocks the opening of the mount section 151 in response to biasing by a spring 171. When the image pickup lens unit 110 is mounted on the camera body 150, the mount barrier 152 is pushed by the base 120 (FIGS. 3 and 5) of the image pickup lens unit 110 and retracts to the inner side of the recess of the mount section 151. When the image pickup lens unit 110 is removed from the camera body 150, the mount barrier 152 returns to a position for blocking the opening of the mount section 151 by biasing of the spring 171.

Figure 5:
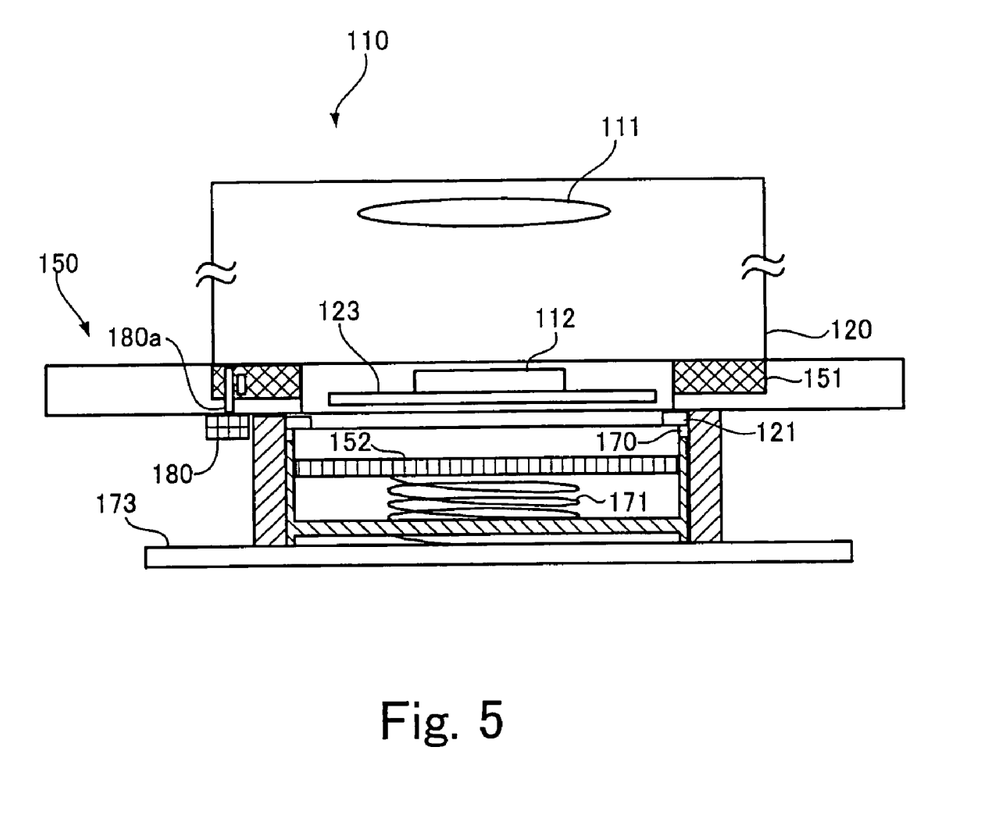
FIG. 5 is a sectional view of the camera system according to the embodiment after the image pickup lens unit is mounted.

FIG. 5 is a sectional view of the camera system according to the embodiment after the image pickup lens unit is mounted.

FIG. 5 shows a state in which the image pickup lens unit 110 is mounted on the mount section 151 of the camera body 150. The image pickup lens unit 110 incorporates therein the photographing optical system 111 and a circuit board 123 having the image pickup element 112 and other elements formed thereon. The camera body 150 incorporates therein the circuit board 173 on which the CPU 154 and other elements are formed.

To mount the image pickup lens unit 110 on the camera body 150 in the state shown in FIG. 4, as shown in FIG. 5, the image pickup lens unit 110 is rotated in a predetermined direction around a lens optical axis while pressing the mount barrier 152 to the inner side of the recess of the mount section 151 with the base 120 of the image pickup lens unit 110 to engage the projections 101 (see FIG. 1) of the image pickup lens unit 110 and the engaging sections 102 (see FIG. 1) of the camera body 150 each other.

In this way, the projections 101 (see FIG. 1) of the image pickup lens unit 110 and the engaging sections 102 of the camera body 150 are engaged, and the body side electric contact 170 and the lens unit side electric contact 121 are connected. The lens unit side electric contact 121 and the body side electric contact 170 are each constituted by plural electric contacts for a power supply, a ground, a CCD_RAW signal, a control signal for AE/AF, an image pickup lens unit control signal, and the like. When the lens unit side electric contact 121 and the body side electric contact 170 are connected, it is possible to exchange a power supply and transmit and receive various signals between the circuit board 123 of the image pickup lens unit 110 and the board 173 of the camera body 150.

When the image pickup lens unit 110 is removed from the camera body 150, the engagement of the projections 101 (see FIG. 1) and the engaging sections 102 is released and the connection of the body side electric contact 170 and the lens unit side electric contact 121 is released by rotating the image pickup lens unit 110 in a direction opposite to the direction described above around the lens optical axis. In this way, removal of the image pickup lens unit 110 is completed.

Figure 6:
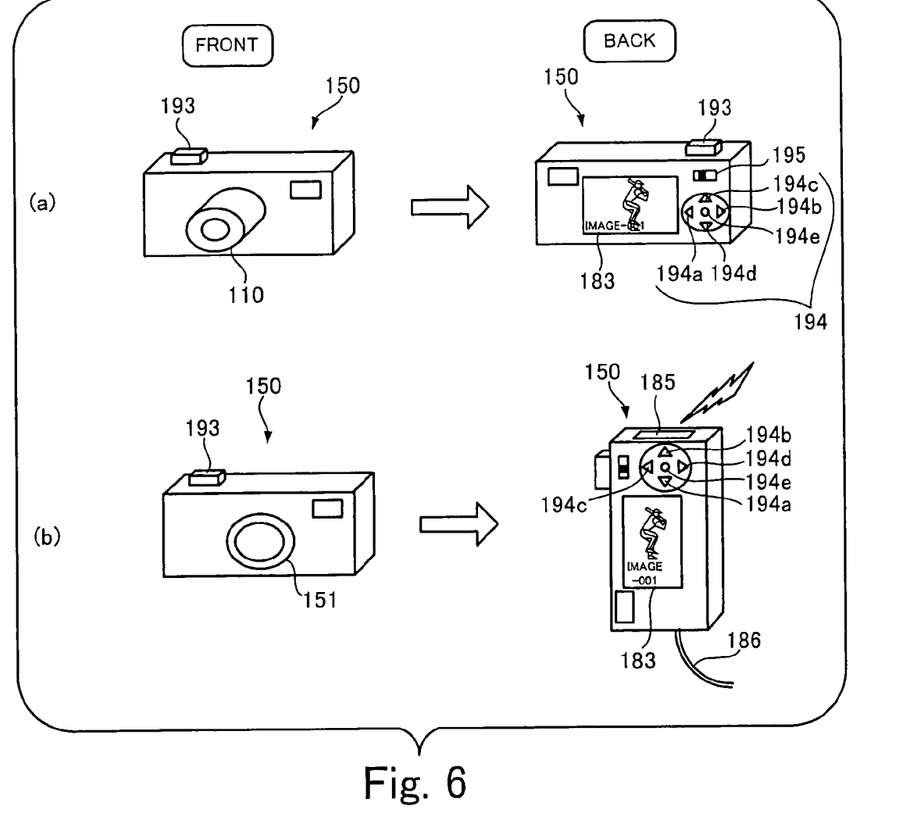
FIG. 6 is a diagram showing the front and the back of the camera body according to the embodiment.

FIG. 6 is a diagram showing the front and the back of the camera body according to the embodiment.

Part (a) of FIG. 6 shows a state in which the camera body 150 having the image pickup lens unit 110 mounted thereon is held in a horizontal position, and part (b) of FIG. 6 shows a state in which the camera body 150 without having the image pickup lens unit 110 mounted thereon is held in a vertical position. The opening of the mount section 151 is blocked by the mount barrier 152.

As shown in parts (a) and (b) of FIG. 6, a release button 193 is arranged on the upper surface of the camera body 150, and a display screen 183 and an operation surface consisting of plural operators such as a cross key 194 and a power supply/photographing/reproduction changeover switch 195 are formed on the back of the camera body 150.

The release button 193 is an operator that is used as a so-called shutter button in the photographing mode in which the image pickup lens unit 110 is mounted on the camera body 150.

The cross key 194 includes left and right two keys 194a and 194b, upper and lower two keys 194c and 194d, and a center key 194e arranged in the center of those four keys. The cross key 194 is used as an operator for switching of a flash mode (automatic forced light emission, red-eye preventing light emission) and a close photographing mode, advancing frames, selecting enlargement or reduction of an image being reproduced, and the like.

The power supply/photographing/reproduction changeover switch 195 is used as an operator for turning ON/OFF of a power supply, switching of the photographing mode and the reproduction mode, and the like.

In addition, the camera body 150 shown in part (b) of FIG. 6 includes an antenna 185 for radio communication that constitutes a communication section of this camera body 150. Note that a universal serial bus (USB) cable 186 may be used instead of this antenna 185 to communicate with an apparatus of a communication partner.

In the camera system 100 according to the embodiment, when the image pickup lens unit 110 is not mounted, the mode switching section 190 forcibly switches the photographing mode to the reproduction mode in response to a detection signal sent by the sensor 180. In other words, when the image pickup lens unit 110 is not mounted, automatic switching to the photographing mode is prohibited and, when the image pickup lens unit 110 is mounted, the mode switching section 190 permits switching to the photographing mode or the reproduction mode.

In addition, this camera system 100 includes the function switching section 191 (see FIG. 3) that switches a function of at least one of the plural operators according to attachment and detachment of the image pickup lens unit 110 to and from the camera body 150. For example, to make it possible to operate the camera body 150 with one hand in the photographing mode at the time when the image pickup lens unit is mounted, the function switching section 191 can switch functions of the release button 193, the cross key 194, and the like. In other words, when the image pickup lens unit 110 is mounted, since the camera body 150 is often held in the horizontal position and operated as shown in part (a) of FIG. 6, the release button 193 is used as a so-called shutter button. However, when the image pickup lens unit 101 is not mounted and the cameral body 150 is held in the vertical position and operated only by the right hand, since the release button 193 is easily operated by the left thumb as shown in part (b) of FIG. 6, the release button 193 may be used as a decision (OK) button in a menu screen (described later) instead of the center key 194e of the cross key 194.

In the cross key 194, when the image pickup lens unit 110 is mounted and the camera body 150 is held in the horizontal position, for example, as shown in part (a) of FIG. 6, functions as operators for frame advance/return are given to the left and right two keys 194a and 194b of the cross key 194 and functions as operators for enlargement/reduction of a display screen are given to the upper and lower two keys 194*c* and 194*d*.

When the image pickup lens unit 110 is not mounted and the camera body 150 is held in the vertical position, as shown in part (b) of FIG. 6, functions of the cross key 194 are switched such that functions as operators for enlargement/reduction of a display screen are given to the left and right two keys 194*a* and 194*b* and functions as operators for frame advance/return are given to the upper and lower two keys 194*c* and 194*d*.

Switching of the functions of the operators is performed by the function switching section 191. Whichever of the horizontal position and the vertical position the camera body 150 is held, since a function is switched to a function of an operator suitable for the position by the function switching section 191, operability of this camera system is improved remarkably.

In addition, it is also possible that, according to attachment and detachment of the image pickup lens unit 110 to and from the cameral body 150, the function of the communication section (including the communication interface 184 and the antenna 185, see FIG. 3) is turned OFF in response to mounting of the image pickup lens unit 110 and the function of the communication section is turned ON in response to removal of the image pickup lens unit 110 by the function switching section 191. In this way, the communication function is automatically turned ON/OFF according to attachment and detachment of the image pickup lens unit 110 to and from the camera body 150, whereby it is possible to further improve operability of this camera system.

Figure 7:
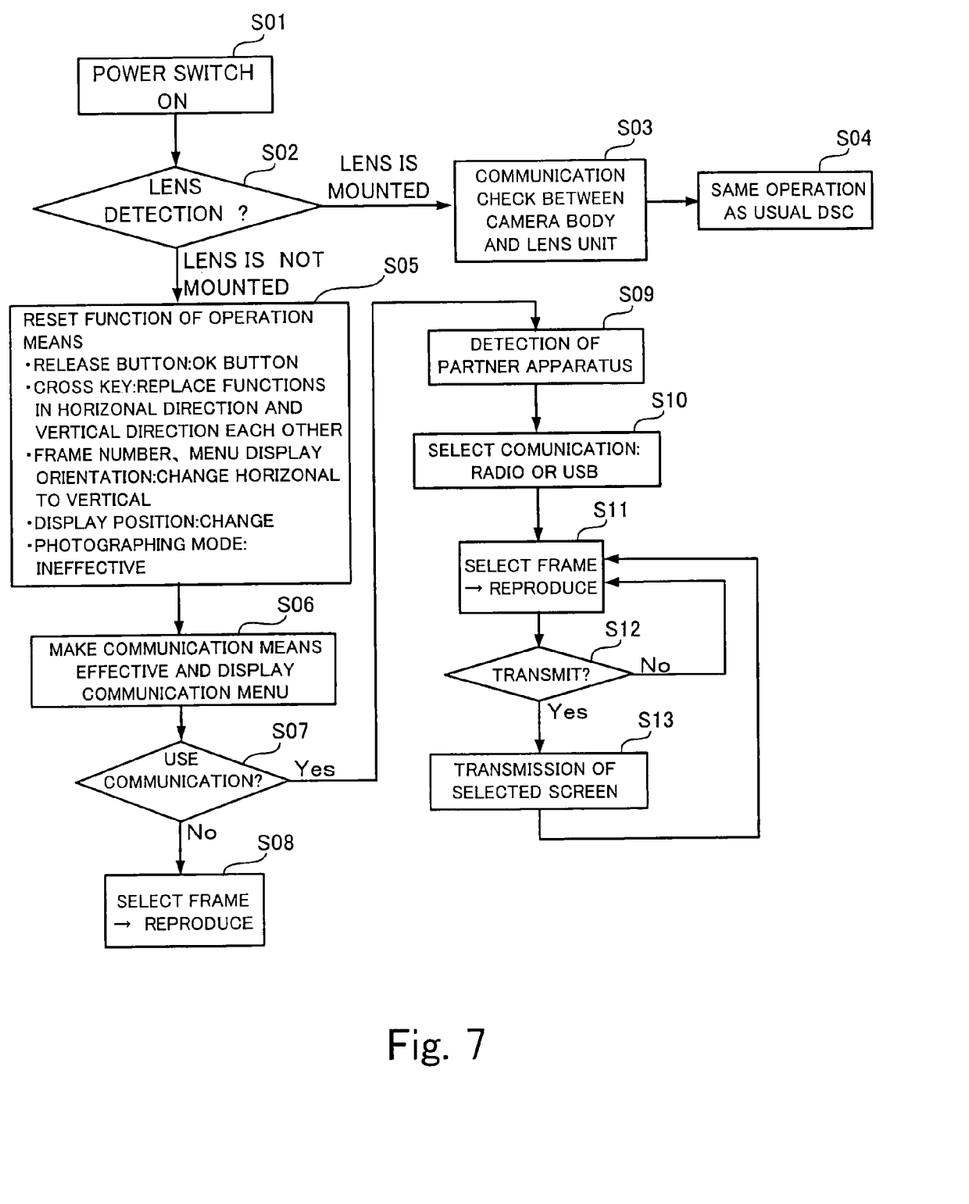
FIG. 7 is a flowchart showing an operation sequence of the camera body according to the embodiment.

FIG. 7 is a flowchart showing an operation sequence of the camera body according to the embodiment.

As shown in FIG. 7, when the power supply/photographing/reproduction changeover switch 195 (see part (a) of FIG. 6) of this camera body is turned ON (step S01), the sensor 180 (see FIG. 3) detects the presence or absence of the image pickup lens unit 110 being mounted on the camera body 150 (step S02).

As a result of the detection in step S02, if it is judged that the image pickup lens unit 110 is mounted on the camera body 150, communication check between the camera body 150 and the image pickup lens unit 110 (check on whether exchange of various signals between the lens unit side electric contact 121 and the body side electric contact 170 is performed without fail, see FIG. 3) is performed (step S03). If a result of the check indicates that communication can be performed between the camera body 150 and the image pickup lens unit 110, it is possible to operate the camera system in both the photographing mode and the reproduction mode in the same manner as a usual digital still camera (DSC) (step S04).

On the other hand, as a result of the detection in step S02, if it is judged that the image pickup lens unit 110 is not mounted on the camera body 150, the processing proceeds to step S05.

In step S05, the mode switching section 190 (see FIG. 3) forcibly switches the photographing mode to the reproduction mode in response to detection of removal of the image pickup lens unit 110 by the sensor 180.

In addition, the function switching section 191 (see FIG. 3) switches a function of the release button 193 (see FIG. 6) such that the release button 193 is used as a decision (OK) button for various menus, replaces operation functions of the left and the right keys and the upper and the lower keys of the cross key 194 (see FIG. 6) each other, and changes a display direction of a frame number and a menu from a left to right direction to a top to bottom direction on the display screen 183 (see FIG. 3). In addition, the function switching section 191 changes a display position of an image on the display screen 183 from a horizontal position to a vertical position. Then, operation in the photographing mode is prohibited.

Next, the function switching section 191 (see FIG. 3) turns ON the function of the communication section (the communication interface 184 and the antenna 185, see FIG. 3) in response to the judgment that the image pickup lens unit 110 is not mounted on the camera body 150. In this way, the function of the communication section is made effective, and a communication menu (described later, see FIG. 9) is displayed on the display screen 183 (see FIG. 3) (step S06).

Next, it is judged whether communication means is used according to a communication menu (step S07).

If it is judged in step S07 that the communication means is not used, a frame of an image, which should be reproduced, is selected, and the image of the selected frame is displayed on the display screen 183 (see FIG. 3) (step S08).

If it is judged in step S07 that the communication means is used, the processing shifts to step S09. In step S09, an apparatus of a communication partner is detected, and a desired communication system for communication with the detected apparatus of the communication partner is selected out of a radio transmission system and a wired transmission system, for example, USB (step S10).

Next, a frame of an image, which should be transmitted, is selected, and the selected image is reproduced (step S11). Next, it is judged whether image, which has been reproduced to that point, are transmitted (step S12).

If it is judged in step S12 that the image is not transmitted, the processing returns to step S11 where a frame of an image is selected and the selected image is reproduced, and the processing in step S12 and subsequent steps is repeated.

If it is judged in step S12 that the image is transmitted, the processing shifts to step S13. After the selected image is transmitted, the processing in step S11 and subsequent steps is repeated.

Figure 8:
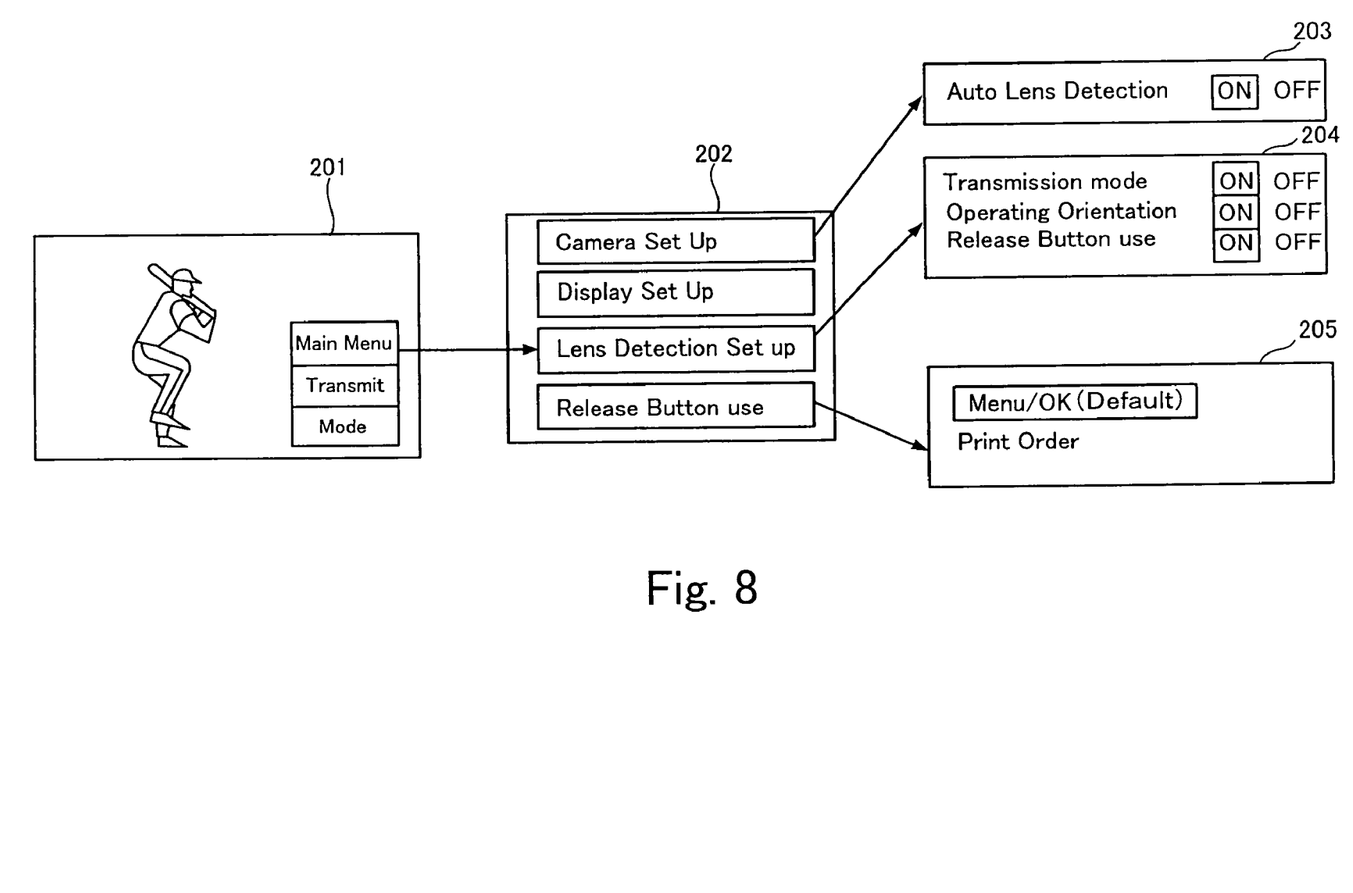
FIG. 8 is a diagram showing a menu screen of the camera body according to the embodiment.

FIG. 8 is a diagram showing a menu screen of the camera body according to the embodiment.

A menu screen 201 shown in FIG. 8 is not explained in the flowchart shown in FIG. 7. However, it is possible to judge whether a mode switching operation of the mode switching section 190 (see FIG. 3) is made effective or ineffective by displaying this menu screen 201 on the display screen 183 (see FIG. 3) first when a power switch of the camera body 150 according to the embodiment is turned ON.

As shown in FIG. 8, two modes, namely, a "Main Menu" mode and a "Transmit" mode are displayed on the menu screen 201 such that a user select one of the modes. When the user clicks the "Main Menu" mode, a setup screen 202 is displayed.

Four items, namely, "Camera Set Up", "Display Set UP", "Lens Detection Set UP", and "Release Button use" are displayed on the setup screen 202.

When the user clicks the "Camera Set Up" mode on the setup screen 202, a selection screen 203 including a message "Auto Lens Detection ON OFF" is displayed. Since "ON" is default on this selection screen 203, when the user clicks neither "ON" nor "OFF", a switching operation of the mode switching section 190, which forcibly switches the photographing mode to the reproduction mode in response to detection of removal of the image pickup lens unit 110 by the sensor 180 (see FIG. 3), remains effective. However, the user can make the switching operation of the mode switching section 190 ineffective by clicking "OFF". Note that it is possible to operate this setup screen 202 from both the photographing mode and the reproduction mode.

When the user clicks "Display Set Up" on the setup screen 202, a message of "Display mode ON OFF" (not shown) is displayed. Here, again, since "ON" is default, if the user clicks neither "ON" nor "OFF", a switching mode is still the automatic switching mode in which an orientation of an image on a display screen is automatically switched by the switching mode switching section 192 according to attachment and detachment of the image pickup lens unit 110. However, when the user clicks "OFF", the automatic switching mode is switched to the manual switching mode by the switching mode switching section 192, and it is possible to switch an orientation of an image on a display screen to both lengthwise and sideways.

When the user clicks "Lens Detection Set Up" on the setup screen 202, a selection screen 204 including three items, namely, "Transmission mode ON OFF", "Operating Orientation ON OFF", and "Release Button use ON OFF" is displayed.

On the selection screen 204, "ON" is default for all the three items. When the user clicks neither "ON" nor "OFF", all the three items are set to the automatic switching mode for automatically switching a function by the switching mode switching section 192 (see FIG. 3), and the function switching section 191 (see FIG. 3) is capable of performing the three actions.

Here, when the user clicks "OFF" of "Transmission mode" on the selection screen 204, the automatic switching mode is switched to the manual switching mode by the switching mode switching section 192, and the action of turning ON and OFF the communication function by the function switching section 191 is made ineffective.

In addition, when the user clicks "OFF" of "Operating Orientation" on the selection screen 204, the automatic switching mode is switched to the manual switching mode by the switching mode switching section 192, and the action of switching a function of an operator, for example, the cross key 194 (see FIG. 6) according to attachment and detachment of the image pickup lens unit 110 to and from the camera body 150 by the function switching section 191 is made ineffective.

When the user clicks "OFF" of "Release Button use" on the selection screen 204, the automatic switching mode is switched to the manual switching mode by the switching mode switching section 192, and the action of switching the function of the release button 193 (see FIG. 6) according to attachment and detachment of the image pickup lens unit 110 to and from the camera body 150 by the function switching section 191 is made ineffective.

When the user clicks "Release Button use" on the setup screen 202, a selection screen 205 appears and the user can designate "Menu/OK (Default)" and "Print Order" there. "Menu/OK (Default)" is used for judging whether the release button 193 at the time when the image pickup lens unit 110 is not mounted is used as an OK button on a menu screen (described later). "Print Order" is used for judging whether the user can use the release button 193 to designate whether an image reproduced on a display screen is printed. In this case, the user presses the release button 193, whereby print designation information, which designates printing of an image file being reproduced, is recorded in a predetermined area of a storage medium 200 such as a memory card. Moreover, the user can designate the number of prints by pressing the release button 193 plural times.

Note that, as shown in part (a) of FIG. 6, when the image pickup lens unit 110 is mounted on the camera body 150 and the camera body 150 is held in the horizontal position, the left and the right two keys 194a and 194b of cross key 194 are used as operators for switching the flash mode (automatic forced light emission, red-eye preventing light emission) and the close photographing mode, the upper and the lower two keys 194c and 194d are used as operators for selecting an item on the menu screen 201, and the center key 194e is used as a decision (OK) button on the menu screen 201.

As shown in part (b) in FIG. 6, when the image pickup lens unit 110 is not mounted on the camera body 150 and the camera body 150 is held in the vertical position, the left and the right two keys 194a and 194b of cross key 194 are used as operators for designating enlargement and reduction of an image reproduced and displayed on the display screen 183, respectively, and the upper and the lower two keys 194c and 194d are used as operators for frame stepping in forward and reverse directions, respectively.

In addition, as shown in part (b) of FIG. 6, when the image pickup lens unit 110 is not mounted on the camera body 150 and the camera body 150 is held in the vertical position, an orientation of an image displayed on the display screen 183 is switched to an orientation for the vertical position according to attachment and detachment of the image pickup element lens unit 110 to and from the camera body 150 by the function switching section 191.

Note that the center key 194e is used as the decision (OK) button on the menu screen 201 in a state in which the image pickup lens unit 110 is mounted. However, in a state in which the image pickup lens unit 110 is not mounted, since it is hard to operate this key 194e, the release button 193 is used as the decision (OK) button on the menu screen 201 instead of the key 194e.

Figure 9:
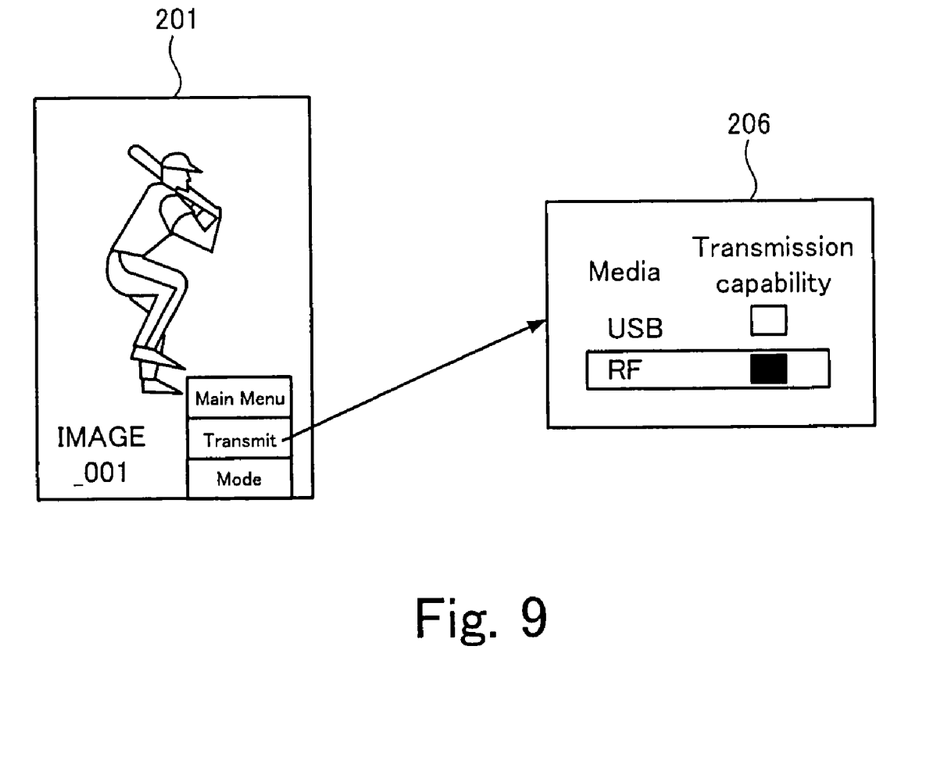
FIG. 9 is a diagram showing a communication means selection screen according to the embodiment.

FIG. 9 is a diagram showing a communication means selection screen according to the embodiment.

The user selects "Media" (a communication medium) and "Transmission capability" (a communication capacity) to be used for communication on this communication means selection screen 206. In this example, it is possible to select one of a USB and a RF (radio communication apparatus) as a communication medium, and a communication speed is inputted as a communication capacity.

What is claimed is:

1. A camera system of an image pickup lens unit detachable type, comprising:

an image pickup lens unit that includes a photographing optical system and an image pickup element; and a camera body that includes a recessed mount section on which the image pickup lens unit is detachably mounted, communicates with the image pickup lens unit mounted on the mount section, and receives an image signal from the image pickup lens unit to apply signal processing to the image signal, wherein the camera body includes:

a mount barrier that blocks an opening of the mount section and is pushed by the image pickup lens unit to retract to the inner part of the recess of the mount section when the image pickup lens unit is mounted;

a sensor that detects attachment and detachment of the image pickup lens unit to and from the mount section;

a display screen that displays an image based on an image signal; and a mode switching section that, according to an operation, freely switches a photographing mode for receiving an image signal from the image pickup lens unit, subjecting the image signal to signal processing, and recording the image signal and a reproduction mode for reading out the recorded image signal and displaying an image based on the image signal on the display screen, and the mode switching section forcibly switches the photographing mode to the reproduction mode in response to detection of removal of the image pickup lens unit by the sensor.

2. The camera system according to claim 1, wherein the camera body includes:
plural operators; and
a function switching section that switches a function of at least one of the plural operators according to attachment and detachment of, the image pickup lens to and from the camera body.

3. The camera system according to claim 1, wherein the camera body displays an image on the display screen in the reproduction mode and also displays an image based on an image signal received from the image pickup lens unit on the display screen in the photographing mode, and includes a function switching section that switches an orientation of an image displayed on the display screen according to attachment and detachment of the image pickup lens unit to and from the camera body.

4. The camera system according to claim 1, wherein the camera body includes:
a communication section that carries out communication with the outside; and
a function switching section that turns OFF a function of the communication section in response to mounting of the image pickup lens unit and turns ON the function of the communication section in response to removal of the image pickup lens unit according to attachment and detachment of the image pickup lens unit to and from the camera body.

5. The camera system according to claim 2, wherein the camera body has an automatic switching mode for automatically switching a function and a manual switching mode in which automatic switching of a function is prohibited and includes a switching mode switching section that switches the automatic switching mode and the manual switching mode, and
the function switching section acts when the automatic switching mode is set.

6. The camera system according to claim 3, wherein the camera body has an automatic switching mode for automatically switching a function and a manual switching mode in which automatic switching of a function is prohibited and includes a switching mode switching section that switches the automatic switching mode and the manual switching mode, and
the function switching section acts when the automatic switching mode is set.

7. The camera system according to claim 4, wherein the camera body has an automatic switching mode for automatically switching a function and a manual switching mode in which automatic switching of a function is prohibited and includes a switching mode switching section that switches the automatic switching mode and the manual switching mode, and
the function switching section acts when the automatic switching mode is set.

8. The camera system according to claim 4, wherein the communication section is a communication section that performs radio transmission.

9. The camera system according to claim 4, wherein the communication section is a communication section that performs wired transmission.

10. A camera body that includes a recessed mount section on which an image pickup lens unit including a photographing optical system and an image pickup element is mounted detachably, communicates with the image pickup lens unit mounted on the mount section, and receives an image signal from the image pickup lens unit to apply signal processing to the image signal, comprising:
a mount barrier that blocks an opening of the mount section and is pushed by the image pickup lens unit to retract to the inner part of the recess of the mount section when the image pickup lens unit is mounted;
a sensor that detects attachment and detachment of the image pickup lens unit to and from the mount section;
a display screen that displays an image based on an image signal; and
a mode switching section that, according to an operation, freely switches a photographing mode for receiving an image signal from the image pickup lens unit, subjecting the image signal to signal processing, and recording the image signal and a reproduction mode for reading out the recorded image signal and displaying an image based on the image signal on the display screen, wherein
the mode switching section forcibly switches the photographing mode to the reproduction mode in response to detection of removal of the image pickup lens unit by the sensor.

11. The camera body according to claim 10, further comprising:
plural operators; and
a function switching section that switches a function of at least one of the plural operators according to attachment and detachment of the image pickup lens unit.

12. The camera body according to claim 10, wherein the reproduction mode is a mode for displaying an image on the display screen and the photographing mode is a mode for displaying an image based on an image signal received from the image pickup lens unit, and
the camera body includes a function switching section that switches an orientation of an image displayed on the display screen according to attachment and detachment of the image pickup lens unit to and from the camera body.

13. The camera body according to claim 10, further comprising:
a communication section that carries out communication with the outside; and
a function switching section that turns OFF a function of the communication section in response to mounting of the image pickup lens unit and turns ON the function of the communication section in response to removal of the image pickup lens unit according to attachment and detachment of the image pickup lens unit to and from the camera body.

14. The camera body according to claim 11, wherein the camera body has an automatic switching mode for automatically switching a function and a manual switching mode in which automatic switching of a function is prohibited and includes a switching mode switching section that switches the automatic switching mode and the manual switching mode, and
the function switching section acts when the automatic switching mode is set.

15. The camera body according to claim 12, wherein the camera body has an automatic switching mode for automatically switching a function and a manual switching mode in which automatic switching of a function is prohibited and includes a switching mode switching section that switches the automatic switching mode and the manual switching mode, and the function switching section acts when the automatic switching mode is set.

16. The camera body according to claim 13, wherein the camera body has an automatic switching mode for automatically switching a function and a manual switching mode in which automatic switching of a function is prohibited and includes a switching mode switching section that switches the automatic switching mode and the manual switching mode, and the function switching section acts when the automatic switching mode is set.

* * * * *